United States Patent Office 3,443,987
Patented May 13, 1969

3,443,987
PROCESS FOR TREATING FIBROUS MATERIAL WITH ALDEHYDE CONDENSATION PRODUCTS AND THE RESULTING MATERIAL
Gerald R. Ferrante, Metuchen, N.J., assignor to Shell Oil Company, New York, N.Y., a corporation of Delaware
No Drawing. Filed Dec. 29, 1965, Ser. No. 517,479
Int. Cl. C21h 5/14; C08j 1/44; C08h 19/02
U.S. Cl. 117—139.4        18 Claims

ABSTRACT OF THE DISCLOSURE

A process for treating fibrous materials to improve their properties which comprises contacting the fibrous material with an aqueous solution containing (1) a crease-proofing amount of a reaction product of (a) an aldehyde having attached to a carbon atom involving the alpha to beta carbon atom relative to the

group a member of the group consisting of a —OH, —SH, and —NH$_2$ radical and a carbon-to-carbon unsaturated linkages, and (b) a dissimilar aldehyde containing the

group as the only reactive group, and (2) a dual catalyst system consisting of a catalytically effective amount of magnesium chloride and acidic salt of a metal of the group consisting of sodium, potassium, aluminum and zinc.

---

This invention relates to a new process for treating fibrous materials. More particularly, the invention relates to an improved process for treating brous material, and particularly textile fabrics, with crease-proofing agents to effect a higher degree of activity under milder operating conditions, and to the resulting products having improved properties.

Specifically, the invention provides a new process for treating fibrous materials, and preferably cellulosic-containing textile materials, with crease-proofing agents, and particularly aldehydes or aldehyde-containing agents, which gives a faster rate of cure under milder reaction conditions, such as smaller concentrations of catalyst and lower reaction times and temperatures. This process comprises treating the fibrous material with an aqueous medium containing the crease-proofing agent, such as, for example, an acrolein-formaldehyde reaction product, and a special curing catalyst combination comprising (1) magnesium chloride and (2) a neutral or an acidic salt of a metal of the group consisting of sodium, aluminum, zinc, and potassium. The invention further provides the new and improved fibrous material prepared by this process.

Cellulosic fabrics, such as cotton and rayon, have rather poor resilience, i.e., they are easily creased and wrinkled when crushed or otherwise subjected to localized physical force. In order to overcome these shortcomings, it has been common practice to treat the fabric with a resin, such as a urea- or melamine-formaldehyde resin, that could be subsequently insolubilized within the fabric fibers. The results obtained with these resins have not been entirely satisfactory, particularly with white goods. In many cases, the materials impart chlorine-retentive properties which causes discoloration on exposure to heat. Furthermore, in many cases large amounts of resin are needed to obtain the desired crease recovery. In addition, many of the fabrics treated with these resins tend to lose their strength and are easily torn. Furthermore, the crease recovery obtained is in many cases lost when the fabric is wet. This renders the material of little use in the manufacture of the new wash and wear type fabrics.

Some of these difficulties have been solved by the use of the new condensates of aldehydes having functional groups attached to the aldehyde group, such as acrolein, and a dissimilar aldehyde, such as formaldehyde, as described in Fischer—U.S. 3,183,054. These new resins give products having no chlorine retentive properties and good wet and dry crease recovery and good spin and line appearance. They are thus satisfactory for preparation of wash and wear type fabrics and the like.

Even with the new resins, however, there are still problems involved, such as the requirement for the use of large amounts of expensive resin, use of high temperatures and extended cure times, loss of strength of fabric, etc., which makes it desirable to find an improved way for the treatment of fabrics with these agents.

It is therefore an object of the invention to provide a new process for treatment of fibrous materials. It is a further object to provide a new process for treatment of fibrous materials with textile treating agents which gives higher degree of reactivity under milder operating conditions. It is a further object to provide a new process for treating textile fabrics which involves the use of smaller amounts of resin. It is a further object to provide a new process for treating textile fabrics which involves the use of milder conditions, such as lower curing temperatures and shorter cure cycles. It is a further object to provide a new process for treating textile fabrics which is more economical to operate than those known heretofore. These and other objects of the invention will be apparent from the following detailed description thereof.

It has now been discovered that these and other objects of the invention may be accomplished by the process of the invention comprising treating the fibrous material with an aqueous medium containing the crease-proofing agent, such as, for example, an acrolein-formaldehyde condensate, and a special curing catalyst combination comprising (1) magnesium chloride and (2) a neutral or an acidic salt of the group consisting of sodium, aluminum, zinc and potassium salt. It has been unexpectedly found that by the use of this process involving the new dual catalyst system one can obtain products having the desired crease recovery properties under more economical and milder reaction conditions. Thus, the amount of resin employed needs to be only about ¼ to ½ normally required. In addition, the curing time required can be cut down to a matter of seconds where previous reactions required several minutes. Further, the reaction temperature can also be greatly reduced from that normally required for cure. With all these improvements one can readily effect a faster and far more economical treating process than has been obtainable heretofore. In addition, such an improvement is obtained without any sacrifice in properties of the resulting products. In fact, in many cases one can obtain greatly improved spin and line appearance ratings than obtainable heretofore.

It was quite surprising to find that the above results could be obtained by the use of the dual catalyst system as each of the components by themselves fail to show any unusual activity and many other types of mixtures have failed to demonstrate an unexpected improvement in activity. The new unexpected synergistic action of the new catalyst system is demonstrated in the working examples at the end of the specification.

The crease-proofing agents used in the process of the invention may be of any type, but the unexpected results are more in evidence when the agents employed are the resinous products obtained by condensing (1) an aldehyde having attached to or involving a carbon atom alpha or beta to the

group a functional group containing oxygen, nitrogen or sulfur, or an aliphatic carbon-to-carbon unsaturated linkage, such as acrolein, with (2) an aldehyde having a

group or groups as the only functional group, such as formaldehyde.

Examples of the first group of aldehydes, containing functional groups, include, among others, 2-hydroxypropionaldehyde, 3 - hydroxypropionaldehyde, 2 - hydroxybutyraldehyde, 3-hydroxybutyraldehyde, 3-mercaptopropionaldehyde, 3-aminopentanal, 2-mercaptohexanal, 2-aminododecanal, 3-hydroxycyclohexanal, acrolein, methacrolein, crotonaldehyde, alpha-phenylacrloein, alpha-cyclohexylacrolein, 2-pentenal, 3-hexanal, 2-decenal, 2-cyclohexenal and 2-hydroxy-3-mercaptotetradecanal.

Preferred members of the first group of aldehydes include the alpha-hydroxy substituted aliphatic and cycloaliphatic monoaldehydes, the alpha-amino substituted aliphatic and cycloaliphatic monoaldehydes, the alpha-mercapto substituted aliphatic and cycloaliphatic monoaldehydes, the alpha,beta-ethylenically unsaturated aliphatic and cycloaliphatic monoaldehydes, the beta-hydroxy-substituted aliphatic and cycloaliphatic monoaldehydes, the beta-amino substituted aliphatic and cycloaliphatic monoaldehyde, the alpha-mercapto substituted aliphatic and cycloaliphatic monoaldehydes, the beta, gamma-ethylenically unsaturated aliphatic and cycloaliphatic monoaldehydes, the total number of carbon atoms in each case not exceeding 14. Also preferred are the above-noted substituted alkanals, cycloalkanals and alkenals and cycloalkenals containing up to 12 carbon atoms.

The preferred members may be exemplified by the following formulae

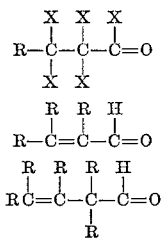

wherein at least one and preferably 1 to 2 X's is or are an OH, SH or $NH_2$ or alkyl substituted amino group, and the other X's are not so occupied is or are a R. R is a member of the group consisting of hydrogen atom and hydrocarbon radicals, and preferably aliphatic and cycloaliphatic hydrocarbon radicals containing up to 12 carbon atoms.

Coming under special consideration are the ethylenically unsaturated aldehydes, particularly because of the outstanding properties of the resulting condensation products in the treatment of textile fabrics. These include, among others, the alpha,beta-ethylenically unsaturated monoaldehydes and the beta-gamma-ethylenically unsaturated monoaldehydes, such as acrolein, methacrolein, crotonaldehyde, alpha-cyclohexylacrolein and the like.

The second aldehyde reactant to be employed in preparation of the condensation products include the dissimilar aldehydes having the aldehyde group or groups as the only functional group. Examples of these unsubstituted mono- and polyaldehydes include, among others, formaldehyde, and materials which engender formaldehyde, such as formalin, paraformaldehyde, trioxane, methylal and the like, acetaldehyde, butyraldehyde, pentanal, hexanal, octanal, dodecanal, cyclohexanal, 2,4-dimethylcyclohexanal, glyoxal, succinaldehyde, glutaraldehyde, 1,8-octanedial, benzaldehyde, adipaldehyde, 3,5-diethylhexanal and the like.

Preferred members of this second group include, formaldehyde and material which engenders formaldehyde, aliphatic and cycloaliphatic saturated monoaldehydes and aliphatic and cycloaliphatic saturated di- and tri-aldehydes containing no more than 12 carbon atoms.

Formaldehyde comes under special consideration, particularly because of the superior products prepared therefrom as to the treatment of cellulosic textiles. Ethylenically unsaturated aldehydes used in the process are preferably the alpha,beta-monoethylenically unsaturated aliphatic, cycloaliphatic or aromatic aldehydes, such as acrolein, methacrolein, crotonaldehyde, alpha - phenylacrolein, alpha-cyclohexylacrolein, 2-pentanal and the like and mixtures thereof.

Formaldehyde may be employed in any of its forms in making the new products. This includes, for example, formalin, paraformaldehyde, trioxane and methylal.

The amount of the unsaturated aldehyde and the formaldehyde to be employed will vary within certain limits. The unsaturated aldehyde and formaldehyde may, for example, be combined in mol ratios varying from say 8:1 to 1:8. Particularly outstanding results are obtained when the aldehyde and formaldehyde are combined in mol ratios varying from 4:1 to 1:4 and more preferably in mol ratios varying from 1:1 to 1:2.

The reaction between the above-described aldehyde reactants is preferably accomplished in an acidic medium. It is preferred to have the reaction medium at a pH between .5 to 6, and still more preferably between .5 to 3. This can be accomplished by the addition of a variety of acidic or acid forming materials, such as, for example, sulfuric acid, alkane sulfonic acids, phosphoric acid, acid metallic halides, such as zinc chloride, stannic chloride, aluminum chloride, acid clays, etc. The concentration of the acids employed and amount added will depend on the particular ingredient selected and the acidity desired. It is generally preferred to utilize moderately strong acids, such as sulfuric acid in concentrations ranging from about 20% to 60% by weight.

When the first type of aldehyde to be employed is an ethylenically unsaturated aldehyde, water should be employed in the reaction. In other cases, water may be employed and is sometimes very desirable. The use of water is particularly desirable as the reaction product may then be used directly in the reaction medium for the treatment of textiles as noted hereinafter. If desired other diluents, such as alcohols, tetrahydrofuran, dimethyl sulfoxide, and the like and mixtures thereof may also be employed.

Temperatures employed may vary over a wide range. As the reaction is exothermic cooling should generally be employed to keep the temperature within the desired range. Preferred temperatures range from about 0° C. to 80° C., and more preferably temperatures range from 10° C. to 50° C. Superatmospheric, atmospheric or subatmospheric pressures may be used as desired.

After the reaction has been completed, the mixture is then neutralized by the addition of suitable basic materials, and then any excess reactants are preferably removed by means, such as distillation, extracting with suitable solvents, such as petroleum ether, chloroform and the like.

The condensation products prepared by the process of the invention are substantially odorless and colorless fluid liquids to viscous liquids to semi-solids. They are water-soluble and in emulsions are compatible with various oils, resins and the like. Analysis shows the products to have OH value and a hemiacetal structure.

The products are indentified as having the structure

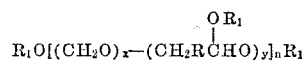

wherein R is an alkylene radical, $x$ is an integer of 1 to 5, $y$ is an integer of 1 to 5 and $n$ is an integer of at least 2, and preferably 2 or 3. At least one of the $R_1$'s is hydrogen and the others may be hydrogen or alkyl groups (preferably containing 1 to 3 carbon atoms), or in some cases, two of the $-OR_1$'s may be removed and the remaining radicals joined together through an oxygen atom to form say a carbonyl group or a cyclic ring.

Preferred condensates are those of the formula

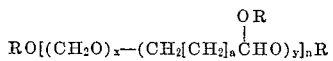

wherein at least one R is hydrogen and the other R's are members of the group consisting of hydrogen and alkyl radicals, $x$ is an integer of 1 to 5, $n$ is an integer of 2 to 5.

The condensation of the above-noted two different types of aldehydes in the presence of a basic catalyst will also give products which are usable in the process of the invention. Examples of suitable catalysts include sodium carbonate, sodium, potassium, calcium or barium hydroxide and the like. The amount of the catalyst used may vary over a wide range. Preferred amounts range from about .25% to 5% by weight of reaction products.

In the condensation using basic catalyst, it is preferred to react one mol of the first type of aldehyde, such as the acrolein, with from 1 to 6 moles of the second type, such as the formaldehyde. To control the exothermic reaction it is preferred to keep the reaction mixture cool by suitable means, such as cooling coils and the like. The desired temperature ranges from about 50° C. to 65° C. After the exothermic reaction is completed, the reaction mixture may be neutralized with a suitable mineral acid, such as hydrochloric acid or sulfuric acid, and in sufficient amount to lower the pH of the mixture to about 2 to 2.5. The reaction mixture is now cooled to room temperature and is ready for use in treating textiles as noted below.

The amount of the crease-proofing agent to be employed in the aqueous solution may vary over a wide range, but the advantages of the invention are more in evident when the amount used is rather small. In general, the desired amount of crease proofing is obtained when the amount of agent varies from about .1% to 8% solution, with preferred amounts ranging from about 1% to 5% by weight.

The catalyst system used in the new process of the invention is made up of two parts, i.e., (1) magnesium chloride and (2) a neutral or acidic salt of the group consisting of sodium, aluminum, zinc and potassium salt. The salts preferably have a pH of 7 down to about 2 or 3. The cation portion of the second group of salts may be of any type but is preferably of the inorganic variety, such as, for example, the fluoborates, chlorates, phosphates, nitrates, perchlorates, persulfates, chromates, borates, fluosilicates, selenates, sulfites, arsenates and the like. Examples of such salts include, among others, sodium fluoborate, potassium fluoborate, aluminum fluoborate, zinc fluoborate, potassium chlorate, aluminum sulfate, aluminum nitrate, zinc persulfate, zinc chlorate, zinc selenate, sodium arsenate and the like.

Preferred salts to be employed with the magnesium chloride include the sodium, aluminum, zinc and potassium salts of inorganic acids containing at least one element of the group consisting of halogen atoms, oxygen, sulfur, nitrogen and phosphorous, and preferably acids of the formula

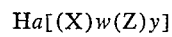

wherein X is a non-metal having an atomic weight above 2, $z$ is an element which tends to gain from 1 to 2 electrons in its outer orbit, $w$ is an integer, $y$ is an integer greater than 1, and $a$ equals the valency of the radical $(X)_w(Z)_y$.

The amount of each component of the dual catalyst system to be employed will vary within certain limits. The magnesium chloride is preferably employed in amounts varying from about 10% to 40% by weight crease-proofing agent to be employed in the aqueous solution. Preferred amounts of the salt used with the magnesium chloride vary from about .5% to 4% by weight of the resin to be employed. Particularly preferred amounts vary from about .5% to 2% by weight.

The solution to be used in treating the fibrous material is preferably prepared by adding the above-noted crease-proofing agent to the water to form the desired concentration and then adding the above-noted catalyst system. The catalysts may be added as separate components or as a mixture. In some preferred operations, it is desirable to add the second component to the crease-proofing agent itself before it is combined with the water. The first component of the catalyst, i.e., the magnesium chloride, is then added to the aqueous solution containing the resin and other salt catalyst.

The application of the solution containing the crease-proofing agent to the fibrous material may be effected in any suitable manner, the method selected depending upon the results desired. If it is desired to apply the solution only to one surface of the material, as, for example, when it is desired to treat the back only of a fabric having a face of artificial or natural silk and a cotton back, the application may be effected by spraying as a liquid or gas or by means of rollers, or the compositions may be spread upon the surface by means of a doctor blade. When, however, it is desired to coat both surfaces of the material, or if the material is to be thoroughly impregnated with it, the material may be simply dipped in the solution or run through conventional-type padding rollers. The solutions may also be applied locally to the material, for example, by means of printing rollers or by stencilling.

The amount of the crease-proofing agent to be deposited on the fibrous material varies over a wide range depending upon the property or properties to be imparted and the use of the finished material. If treated material is a fabric that is to have a soft feel, such as that intended for use for dresses, shirts, etc., the amount of crease-proofing agent deposited will generally vary from 1% to 20% by weight of the fabric. If stiffer materials are required such as for shoe fabrics, draperies, etc., still higher amounts of agent, such as of the order of 25% to 50% by weight may be deposited. If the fibrous materials to be treated are paper and the property to be imparted is wet strength, the amount of material deposited may vary from about .1% to 15% by weight.

If the desired amount of the crease-proofing agent deposited is not obtained in one application, the solution can be applied again or as many times as desired in order to bring the amount of the agent up to the desired level.

After the desired amount of solution has been applied, the treated material is preferably dried for a short period to remove some or all of the dispersing liquid, such as water, alcohol, and the like. This is generally accomplished by exposing the wet material to hot gas at temperatures ranging from 50° C. to 150° C. The period of drying will depend largely on the amount of pick-up permitted during the application of the solution, and the concentration of the crease-proofing agent. In most instances, drying periods of from 2 to 30 minutes should be sufficient.

The dried material is then exposed to relatively high temperatures to accelerate the cure. Temperatures used for this purpose generally range from 70° to 300° C., and more preferably from 100° C. to 150° C. At these preferred temperature ranges the cure can generally be accomplished in from 1 to 10 minutes. Exposures of less than 1 minute, e.g., 15 seconds, can be used in continuous, commercial processing.

After curing, it is desirable in most cases to wash the treated material to remove any soluble materials. A perborate wash is particularly desirable.

The above-described process may be utilized for the treatment of any fibrous material. This includes the textile material, such as woven fabrics, non-woven fabrics, threads, yarn, cord, and string, paper, hides, leather, films and the like. These materials may be prepared from natural silk and artificial silk, such as silk obtained from cellulose acetate or other organic esters or others of cellulose, rayons, jute, hemp, animal fibers, such as wood, hair, and the like as well as synthetic materials which includes, among others, those prepared from polyesters, acrylonitrile (Orlon-100% acrylonitrile polymer), vinylidene cyanide polymers, polyamides (nylon-super polyamide), polyester-polyamides, cellulose esters and ethers, and polymers prepared from corn protein and formaldehyde (Zein). As in the above-noted addition polymers, this includes the homopolymers as well as copolymers and terpolymers, such as, for example, Acrilan (85% acrylonitrile and 15% vinyl acetate), Dynel (60% vinyl chloride and 40% acrylonitrile) and saran (85% vinylidene chloride and 15% vinyl chloride). Other synthetic fibers include those prepared from polyethylenes and polypropylenes, polyurethanes (perluran), mineral fibers (Fiberglas) and alginic materials as alginate rayon. This also includes blends of these materials with others such as cotton, rayon, wool, linen and the like.

If paper is to be treated, it may be one prepared from wood, cotton, linen, hemp, jute, mulberry, straw, bamboo, cane fibers or mixtures thereof, by any of the known processes such as the sulfate process, soda process and sulfite process.

The hides to be treated include cowhide, calfskin or other hides commonly employed in the preparation of leather goods. The resulting leather may also be treated.

The fibrous materials treated may be colorless or may be dyed, printed or otherwise colored to the desired shade. It is also possible to first subject the colorless material to the process of the invention and then apply the desired dye, pigment or other coloring material.

The materials treated according to the above-described process have many improved properties. The textile materials have improved resistance to creasing and shrinking as well as better resistance to pilling, fraying and snagging and improved dyeability. The paper has better wet strength and tear resistance as well as better abrasion resistance and improved fold endurance. The hides have better tanning properties and the treated leather has improved resistance to scuffing and loss of tanning properties.

The products treated as noted above may be utilized for any of the conventional applications, such as in the manufacture of dresses, drapes, upholsteries, shoes, towels, cords, construction paper, wrapping paper, containers and the like. The use will, in many cases, determine the amount of agent to be applied. Thus, less product will be utilized when the material is to be used for making soft goods, such as dresses, shirts and the like than where crispness and fullness is desired, such as in making rug, drapes, shoe fabrics and the like.

To illustrate the manner in which the invention may be carried out, the following examples are given. It is to be understood, however, that the examples are for the purpose of illustration and the invention is not to be regarded as limited to any of the specific materials or conditions recited therein.

The appearance values reported in the examples are determined by AATCC Test Method 88A–1964T, and the tensile strength values are determined by the Grab Method ASTM D–1682–59T. Pilling resistance is determined by ASTM D1375–59T Brush and Sponge Method.

All tests are carried out at 65% relative humidity and 70° F.

Unless otherwise indicated, parts in the examples are parts by weight.

EXAMPLE I

This example illustrates the superior results obtained by treating cotton broadcloth fabric with an aqueous solution of an acrolein-formaldehyde condensate using a mixture of magnesium chloride and sodium fluoborate as the dual catalyst system.

A. An acrolein-formaldehyde condensate was prepared as follows: To a suspension of 3.7 mols of formaldehyde in 150 parts of 30% sulfuric acid was added 1 mol of freshly distilled acrolein. The mixture had a normality of about .8 or a pH of about 1. The temperature rose from 14° C. to 40° C. The mixture was cooled and then held at room temperature for 12 hours by cooling. The mixture was filtered and the clear filtrate neutralized with calcium oxide.

3.7 parts of the reaction product prepared above was combined with water to form 3.7% solution and a catalyst system made up of 0.74% $MgCl_26H_2O$ and 0.074% sodium fluoborate was added. The solution was applied to the cotton fabric by means of a Butterworth 3 roll laboratory padder. The cloth after padding showed an 80% pick-up. The impregnated cloth was then dried at 120° F., and cured at 275° F. for 1 minute. The finished product was then washed with warm water, rinsed in cold water to remove any soluble materials and then dried in an electric dryer.

The resulting product had a spin and line appearance rating of 4.1 and filling tensile of 24 lbs.

B. The above experiment was repeated with the exception that the catalyst utilized was only the 0.74% magnesium chloride. In this case, the product had a spin and line rating of 1.5 and filling tensile of 55 lbs.

C. The above experiment was repeated with the exception that the catalyst utilized was only the 0.074% sodium fluoborate. In this case, the product had a spin and line rating of 1.5 and filling tensile of 53 lbs.

A comparison of the results in A, B and C above indicates that the unexpected improvement is a synergistic action resulting from the unique combination of catalyst components rather than a mere summation of the results obtained by each component individually.

EXAMPLES II–IV

The procedure shown in Example I was repeated with the exception that the amount of the acrolein-formaldehyde resin and the curing agents were varied and the solution was applied to cotton broadcloth. The results are shown in the table below:

| Experiment No. | Components in solution | Cure conditions | Spin and line ap. | Filling tensile (lbs.) |
|---|---|---|---|---|
| II | 5% acrolein-formaldehyde solution 1% $MgCl_26H_2O$ 0.1% $KBF_4$. | 1 minute at 300° F. | 4.7 | 16 |
| III | 5% acrolein-formaldehyde 1% $MgCl_26H_2O$ 0.05% $KBF_4$. | _____do_____ | 4.4 | 21 |
| IV | Same as II | 1 minute at 250° F. | 4.4 | 21 |

EXAMPLE V

Example II was repeated with the exception that the curing conditions were changed to 30 seconds at 300° F. With such a short cure cycle, it was surprising to find that the spin and line appearance was 4.4 and 24 lbs. filling tensile. This indicates that with the new dual catalyst system, the mills might run at 300 yards per minute rather than the present 50 to 100 yards per minute.

EXAMPLE VI

Example II was repeated with the exception that the curing conditions were changed to 1 minute at 200° F. With such a low temperature of 200° F., it was surprising to find that the product had a spin and line appearance of at least 2.9 and filling tensile of 39 lbs. This is also of importance as it indicates that with the new dual catalyst system, the cure may be obtained as low as 200° F., which has been impossible heretofore.

EXAMPLE VII

Examples I to VI are repeated with the exception that the potassium fluoborate is replaced with each of the following: $AlF_3$, $AlCl_3$, $ZnSnF_6$, $KF$, $Zn(BF_4)_2$, $AlK(SO_4)_2$, $Al_2(SO_4)_3$ and $Na_2SeF_6$. Related results are obtained.

EXAMPLE VIII

Examples I to VII are repeated with the exception that the acrolein-formaldehyde condensate is replaced with one prepared in the presence of caustic. Related results are obtained.

EXAMPLE IX

Examples I to VII are repeated with the exception that the textile treated is a blend of 50% polyester and 50% cotton. Related results are obtained.

EXAMPLE X

Examples I to VII are repeated with the exception that the agent employed is a hydracrylaldehyde-formaldehyde resinous condensation product. Related results are obtained.

EXAMPLE XI

The unexpected efficiency of the claimed process is shown in the following experiment wherein the crease-proofing agent of acrolein-formaldehyde condensate, was prepared containing radioactive material so that its presence on the cloth could be traced. Experiments were prepared with and without the use of the dual catalyst system. The following results in the table below establish that the dual catalyst system makes the system about 34% efficient as compared to 13% for the one catalyst system.

|  |  |  |  | Percent/w. acrolein-formaldehyde condensate | | Appearance ratings | | |
|---|---|---|---|---|---|---|---|---|
| No. | Application | Drying conditions | Curing conditions | Acrolein | Formaldehyde | Tumble | Spin and line | Filling tensile (lbs.) |
| 1 | 10% owf[2] acrolein-formaldehyde 2% owf $MgCl_26H_2O$. | 2 min. at 250° F | 2 min. at 300° F | 1.31 (13.1)[1] | 0.46 (4.6) | 3.9 | 3.8 | 33 |
| 2 | 6% owf acrolein-formaldehyde 0.6% owf $MgCl_26H_2O$ 0.1% owf $KBF_4$. | 8 min. at 120° F | 2 min. at 275° F | 2.05 (34.2) | 1.40 (23.5) | 5.0 | 4.6 | 19 |
| | None | | | | | 1.0 | 1.0 | 41 |

[1] (Numbers in parentheses equal percent efficiency), i.e., percent w. acrolein-formaldehyde found/percent w. acrolein-formaldehyde applied ×100.
[2] owf = on weight of fabric.

EXAMPLE XII

The procedure in Example I was repeated except that 3 parts of the acrolein-formaldehyde condensate was combined with water to form a 3% solution and a catalyst system made up of 0.6% $MgCl_26H_2O$ and 0.03% sodium fluoroborate was added. The solution was applied to a 65–35 polyester/cotton broadcloth by means of a 3 roll padder. The padded cloth showed a 100% pick-up. The fabric was dried for 8 minutes at 120° F. and cured 3 minutes at 300° F. The fabric was washed first with ½% aqueous caustic solution and then with warm water, framed to dimension and dried at 250° F.

The results were as follows:

|  | Spin and line appearance | Filling tensile | Pills/sq. in. |
|---|---|---|---|
| Untreated | 4.4 | 55 | 39 |
| Treated | 5.1 | 60 | 30 |

Comparison of the above results shows the treatment improved the appearance rating and resistance to pilling without affecting the tensile strength adversely.

EXAMPLE XIII

Viscose rayon challis was padded to 100% pick-up with an aqueous solution containing containing 15% acrolein-formaldehyde condensate and 3% $MgCl_26H_2O$. A second sample of the challis was padded to 100% pick-up with an aqueous solution of 8% acrolein-formaldehyde condensate plus a catalyst system consisting of 1.6% $MgCl_26H_2O$ and 0.8% sodium fluoborate. Both fabrics were dried for 8 minutes at 120° F. The first fabric was cured 2 minutes at 300° F. while the second fabric, containing the sodium fluoborate, was cured 1 minute at 300° F. Both fabrics were water washed and dried.

The following results were obtained:

|  | Spin and line appearance | Filling tensile |
|---|---|---|
| Untreated | 1.7 | 53 |
| 15% acrolein/formaldehyde 3% $MgCl_26H_2O$ cured 2 min. at 300° F | 3.6 | 59 |
| 8% Acrolein/formaldehyde 1.6% $MgCl_26H_2O$ 0.8% $NaBF_4$ cured 1 min. at 300° F | 3.9 | 47 |

Thus, the same performance can be obtained on rayon by using vastly reduced amount of acrolein/formaldehyde condensate and reduced cure time by incorporation of a small amount of sodium fluoborate.

I claim as my invention:

1. A process for treating fibrous materials to improve their properties which comprises contacting the fibrous material with an aqueous solution containing (1) a crease-proofing amount of a reaction product of (a) an aldehyde having attached to a carbon atom involving the alpha to beta carbon atom relative to the $$-\overset{H}{\underset{}{C}}=O$$

group a member of the group consisting of a —OH, —SH, and —$NH_2$ radical and a carbon-to-carbon unsaturated linkage, and (b) a dissimilar aldehyde containing the $$-\overset{H}{\underset{}{C}}=O$$

group as the only reactive group, and (2) a dual catalyst system consisting of a catalytically effective amount of magnesium chloride and acidic salt of a metal of the group consisting of sodium, potassium, aluminum and zinc.

2. A process as in claim 1 wherein the crease-proofing reaction product is a condensate of acrolein and formaldehyde.

3. A process as in claim 1 wherein the crease-proofing reaction product is a condensate of hydracryaldehyde and formaldehyde.

4. A process as in claim 1 wherein the magnesium chloride is employed in an amount varying from 1% to 40% by weight of the crease-proofing reaction product.

5. A process as in claim 1 wherein the acidic salt is employed in an amount varying from .01% to 4% by weight of the crease-proofing reaction product.

6. A process as in claim 1 wherein the treated fibrous material is cured for a few seconds to 3 minutes at a temperature below about 300° F.

7. A process as in claim 1 wherein the amount of the crease-proofing reaction product in the solution varies from about 1% to 8% by weight.

8. A process for treating textile fabric to improve crease resistance which comprises impregnating the fabric with an aqueous solution containing a crease-proofing amount of an acrolein-formaldehyde condensate and a catalytically effective amount of a dual catalyst system consisting of magnesium chloride and an inorganic acidic salt of a metal of the group consisting of sodium, potassium, aluminum and zinc.

9. A process as in claim 8 wherein the textile fabric is a cellulosic-containing fabric.

10. A process as in claim 8 wherein the textile fabric is cotton.

11. A process as in claim 8 wherein the textile fabric is rayon.

12. A process as in claim 8 wherein the textile fabric is a blend of cotton and a polyester fiber.

13. A process as in claim 8 wherein the acidic salt is potassium fluoborate.

14. A process as in claim 8 wherein the acidic salt is sodium fluoborate.

15. A process as in claim 8 wherein the acidic salt is aluminum chloride.

16. A process as in claim 8 wherein the acrolein-formaldehyde condensate was prepared in the presence of an acidic catalyst.

17. A process as in claim 8 wherein the acrolein-formaldehyde condensate was prepared in the presence of a basic catalyst.

18. A process for treating cellulosic-containing textile fabric to improve their crease resistance in an economical and efficient manner which consists of impregnating the fabric with an aqueous solution containing a crease-proofing amount of an acrolein-formaldehyde condensate and a catalytically effective amount of a dual catalyst system consisting of magnesium chloride and potassium fluoborate, and then curing the treated fabric at a temperature between 100° C. and 300° C. for a period of from a few seconds to not more than 3 minutes.

References Cited

UNITED STATES PATENTS

| | | | |
|---|---|---|---|
| 2,696,477 | 12/1954 | Gagarine et al. | 117—139.4 |
| 3,183,054 | 5/1965 | Fischer et al. | 8—116.4 X |
| 2,299,786 | 10/1942 | Battye et al. | 117—139.4 |

WILLIAM D. MARTIN, *Primary Examiner.*

THEODORE G. DAVIS, *Assistant Examiner.*

U.S. Cl. X.R.

117—138.8, 141, 143, 144, 154